United States Patent
Waelde et al.

(10) Patent No.: US 10,594,017 B2
(45) Date of Patent: Mar. 17, 2020

(54) ANTENNA DEVICE AND METHOD FOR TRANSMITTING AND/OR RECEIVING A SIGNAL

(71) Applicant: VEGA GRIESHABER KG, Wolfach (DE)

(72) Inventors: Steffen Waelde, Niedereschach (DE); Roland Welle, Hausach (DE)

(73) Assignee: VEGA GRIESHABER KG, Wolfach (DE)

( * ) Notice: Subject to any disclaimer, the term of this patent is extended or adjusted under 35 U.S.C. 154(b) by 180 days.

(21) Appl. No.: 15/348,643

(22) Filed: Nov. 10, 2016

(65) Prior Publication Data
US 2017/0141453 A1 May 18, 2017

(30) Foreign Application Priority Data
Nov. 17, 2015 (WO) ................ PCT/EP2015/076854

(51) Int. Cl.
*H01Q 1/22* (2006.01)
*H01Q 3/24* (2006.01)
(Continued)

(52) U.S. Cl.
CPC .......... *H01Q 1/225* (2013.01); *G01F 23/284* (2013.01); *G01S 7/03* (2013.01); *G01S 7/35* (2013.01);
(Continued)

(58) Field of Classification Search
CPC .. H01Q 1/225; H01Q 3/24–42; H01Q 21/065; G01F 23/00–76; G01S 13/00–958
See application file for complete search history.

(56) References Cited

U.S. PATENT DOCUMENTS 5,229,728 A * 7/1993 Carvalho ................. H01P 5/12
29/600
7,847,731 B2 12/2010 Wiesbeck et al.
(Continued)

FOREIGN PATENT DOCUMENTS

CN 101726342 A 6/2010
CN 203287081 U 11/2013
(Continued)

OTHER PUBLICATIONS

Chinese Office Action dated Nov. 21, 2019 in corresponding Chinese Patent Application No. 201611019463.8, (21 pages).

*Primary Examiner* — Gennadiy Tsvey
(74) *Attorney, Agent, or Firm* — Oblon, McClelland, Maier & Neustadt, L.L.P.

(57) ABSTRACT

There is provided an antenna device including a signal source configured to generate a transmit signal with a basic frequency, a control device, and a first transmit channel. The transmit channel includes a first frequency conversion device and a first transmit device with a first frequency pass band. The control device is connected to the first frequency conversion device, which is configured to perform time-controlled conversion of the basic frequency of the transmit signal to a first transmit frequency, which lies in the first frequency pass band of the first transmit device, in order to provide via the first transmit channel a first transmit signal with the first transmit frequency.

14 Claims, 11 Drawing Sheets

(51) Int. Cl.
*H01Q 19/17* (2006.01)
*G01S 7/03* (2006.01)
*G01S 13/34* (2006.01)
*H01Q 21/06* (2006.01)
*G01S 13/42* (2006.01)
*H01Q 3/26* (2006.01)
*G01S 7/35* (2006.01)
*G01S 13/89* (2006.01)
*G01F 23/284* (2006.01)
*G01S 13/88* (2006.01)
*H01Q 21/00* (2006.01)
*G01F 22/00* (2006.01)

(52) U.S. Cl.
CPC ............ *G01S 13/34* (2013.01); *G01S 13/426* (2013.01); *G01S 13/88* (2013.01); *G01S 13/89* (2013.01); *H01Q 3/24* (2013.01); *H01Q 3/26* (2013.01); *H01Q 19/175* (2013.01); *H01Q 21/00* (2013.01); *H01Q 21/065* (2013.01); *G01F 22/00* (2013.01)

(56) References Cited

U.S. PATENT DOCUMENTS

| | | |
|---|---|---|
| 8,633,851 B2 | 1/2014 | Vacanti et al. |
| 2006/0201246 A1 | 9/2006 | Rolfes et al. |
| 2009/0284440 A1* | 11/2009 | Weidmann ............ H01Q 21/061 343/893 |
| 2010/0103024 A1 | 4/2010 | Schultheiss et al. |
| 2014/0208845 A1 | 7/2014 | Zlotnick et al. |
| 2014/0253147 A1 | 9/2014 | Kleman et al. |

FOREIGN PATENT DOCUMENTS

| | | |
|---|---|---|
| DE | 10 2007 039 897 B3 | 10/2008 |
| EP | 1 701 142 A2 | 9/2006 |
| EP | 2 189 765 A1 | 5/2010 |
| WO | WO 2008/066436 A1 | 6/2008 |
| WO | WO 2010/144936 A1 | 12/2010 |
| WO | WO 2015/052699 A1 | 4/2015 |
| WO | WO 2015/120885 A1 | 8/2015 |

\* cited by examiner

ANTENNA DEVICE AND METHOD FOR TRANSMITTING AND/OR RECEIVING A SIGNAL

FIELD

The present invention relates to the technical field of measurement technology.

BACKGROUND

To determine the fill level of a filling material or bulk material in a container, topology-detecting fill level measuring devices can be used. These measuring devices scan the surface of the filling material and/or bulk material with an electronic signal and can further utilise the knowledge of the three-dimensional surface topology of the filling material and/or the bulk material derived from scanning to determine, assuming a known area underneath the filling material, the volume of the filling material and/or, in the case of a known density, to determine the mass or other variables to be derived from this. To carry out scanning, a beam of an electromagnetic wave is passed over the filling material or the bulk material and the reflection behaviour at different angles is observed and evaluated.

A three-dimensional (3D) fill level measurement or a topology measurement using electromagnetic waves, in particular using radar signals, may open up new application objectives in the measurement of materials.

Patent document DE 10 2007 039 397 B3 describes a method for operating an antenna group having a plurality of transmitters and a plurality of receivers as well as an associated device. Printed publication WO 2015/052699 A1 relates to a method for evaluating the contents of a container by means of a multiplicity of acoustic transmit/receive arrays. Printed publication WO 2015/120885 A1 relates to a measuring device and to a method for detecting properties of an object.

SUMMARY

According to an embodiment, an antenna device, a fill level measuring device having an antenna device, a method for transmitting and/or receiving a signal, a program element for transmitting and/or receiving a signal and a computer-readable storage medium for transmitting and/or receiving a signal are specified.

It may be desired to create an effective antenna device for measuring fill levels.

The subject of the claimed invention is determined by the independent claims. Other embodiments of the invention emerge from the subordinate claims and the following description.

According to an embodiment, an antenna device is described that has a signal source for generating a transmit signal with a basic frequency, a control device and a first transmit channel. The transmit channel has in turn a first frequency conversion device and a first transmit device, which has a first frequency pass band. The signal source is connected to the first frequency conversion device and the control device is connected to the first frequency conversion device. The control device is connected to the first frequency conversion device in such a way that it can execute a time-controlled conversion of the basic frequency of the transmit signal to a first transmit frequency, which lies in a first frequency pass band of the first transmit device, in order to provide a first transmit signal with the first transmit frequency over the first transmit channel. The conversion of the basic frequency of the first transmit signal to the first transmit frequency, which lies in the first frequency pass band, takes place according to a specifiable first time schedule.

In other words, the control device can control the conversion of the basic frequency of the transmit signal to the first transmit frequency in a time-controlled manner. The conversion of the frequency may take place in such a way that at times in which the antenna device is to be active, thus is to transmit and/or receive for example, the frequency conversion device is activated in order to transform the transmit signal to a frequency range that is adapted to the transmit device. In particular, the frequency conversion device may transform the transmit signal into a pass band of the transmit device in such a way that the transmit signal is sent by the transmit device. Thus it may be decided whether the transmit signal is transmitted or not by the switching on and off or the activation and deactivation of the frequency conversion device. The switching on and off takes place at a low frequency, so that low-frequency switches can be used, for example relays or electronic switches. Expensive high-frequency components can thus be avoided.

The antenna device can in particular be an antenna device for what is known as a MIMO (multiple-input multiple-output) fill level radar unit, which operates according to the FMCW (frequency-modulated continuous-wave) principle and emits a transmit signal per transmit cycle and transmit branch, which signal has a frequency ramp. The typical time for a transmit cycle is 5 milliseconds, for example.

A single signal source can be provided that has a voltage-controlled oscillator (VCO) and a phase-locked loop (PLL). According to an embodiment, a plurality of transmit channels (or combined transmit/receive channels) and a plurality of receive channels are provided. Each transmit (or transmit/receive channel) and receive channel has its own frequency conversion device, for example a frequency multiplier. For the time-controlled conversion of the basic frequency of the transmit signal to the first transmit frequency, a switch unit is provided for each frequency conversion device in order to switch the frequency conversion device on or off according to the specifiable time schedule. The various switch units can also be combined with one another as shown in FIGS. 4 and 5, in which a switch unit switches back and forth between two frequency conversion devices.

The switching on of a frequency conversion device leads to the frequency in the corresponding transmit channel being multiplied. If the corresponding frequency conversion device is switched off, on the other hand, no frequency-multiplied transmit signal ideally appears at the output of the frequency conversion device, which means that no transmit signal is radiated via the antenna.

The circuit of the antenna device is thus not an energy-saving circuit, which can deactivate selected transmit channels in a time-controlled manner, but is instead a circuit for generating a co-array.

The various co-arrays are generated in that the different transmit channels are switched on or off according to the specified time schedule (more precisely: the corresponding frequency conversion devices). Alternatively to a time-division multiplexing method, a frequency-division or code-division multiplexing method can be used to generate a co-array. However, with a frequency-division or code-division multiplexing method the transmit channels are activated simultaneously, or the frequency conversion devices are operated permanently. The claimed invention thus serves to generate a co-array according to the time-division multiplexing method.

If a certain transmit channel is to be used for a measurement, the time during which the frequency conversion device is switched on is typically 5 milliseconds, thus the time for a measuring cycle.

A (virtual) co-array described above results from a discrete convolution of the positions of the transmit and receive channels (more precisely: the positions of the transmit and receive elements arranged on the antenna, which can be executed in the form of flat antenna patches). The (virtual) co-array in this case has an aperture, which would have a (physical) receive array if only one transmitter were located in the middle of the receive array. The aperture of the co-array is larger and/or more densely populated compared with the actual aperture of the transmit and receive array.

By evaluating the signals of the individual receive channels that always receive signals when at least one transmitter is switched on, a surface profile of a bulk material can be calculated. To this end, the information regarding the time and spatial position of the actual (physically present) array at which a transmitter has transmitted a transmit signal flows, among other things, into a calculation algorithm.

According to an embodiment, a fill level measuring device is provided for determining a fill level and/or for determining a surface structure of an object with an antenna device as described above and in the following.

Also according to an embodiment, a method is described for transmitting and/or receiving a signal.

In one example, the first time schedule may be a constituent of a time-division multiplexing method.

According to an embodiment, a program element and a computer-readable storage medium are specified, which contain program code that serves to execute a method for transmitting and/or receiving a signal when executed by a processor.

In one example, a MIMO (multiple-input multiple-output) radar unit or a MIMO antenna arrangement for determining a fill level and a topology may be provided, in which a frequency-multiplying high-frequency component is used as a frequency conversion device. By targeted switching on and off of the supply voltage, this frequency-multiplying high-frequency component or the frequency conversion device acts as a high-frequency switch. The high-frequency component may be part of a transmit channel, which can also act as receiver, wherein due to the time-controlled switchover of a multiplicity of transmit channels and/or receive channels, which are arranged in an array or in an antenna group, a co-array can be generated. This co-array or virtual array can correspond to a physical array, which has a number of antenna elements, which corresponds to the multiplication of the number of transmit devices by the number of receive devices. A transmit device that can also receive is termed a transmit/receive device.

In one example, an evaluation device or an evaluation unit may be used, which processes the signals, which are detected by the antenna elements, in particular by the receive devices. This evaluation unit may determine the topology of the filling material surface and/or at least a value derived therefrom from the processed signals and may provide this value at an interface. The interface can also be a two-conductor connection, which may also be used for the energy supply as well as the provision of the topology or the value derived therefrom.

A method, which is executed in an evaluation device, can be used to process the signals received by the receive channels in such a way that a fill level calculation is possible using the signals. Here the evaluation device may use methods of digital beamforming (DBF) and/or methods for the formation of a virtual co-array, for example by discrete convolution.

According to an embodiment, the antenna device also has at least a second transmit channel. This second transmit channel is structured substantially identically to the first transmit channel and has a second frequency conversion device and a second transmit device. When the transmit channels are arranged at different positions or locations, substantially similar signals are generated that originate from different positions.

According to an embodiment, at least one transmit channel, which is selected from the group of channels that consists of the first transmit channel and the at least one second transmit channel, has a transmit/receive mixing device. The transmit/receive mixing device is connected to the first frequency conversion device of the first transmit channel and/or to one of the second frequency conversion devices of the respective at least one second transmit channel. The receive signal has the same frequency as the transmit signal. However, if an FMCW radar method is used, a signal with variable frequency in the form of a frequency ramp is sent or a chirp signal. In this case, the transmit signal and the receive signal have the same frequency ramp.

Furthermore, the transmit/receive mixing device is configured in such a way that the first receive signal and/or the at least one second receive signal can be provided as a first transmit/receive intermediate frequency signal and/or as at least a second transmit/receive intermediate frequency signal.

According to an embodiment, the antenna device has at least one receive channel. If the receive channel and/or transmit channel is responsible exclusively for transmitting or receiving, the channels can be described as pure channels.

According to an embodiment, at least one of the first frequency conversion devices and the respective second frequency conversion device is connected to a switchable energy supply in order to facilitate the time-controlled conversion of the basic frequency of the transmit signal to the first transmit frequency and/or the time-controlled conversion of the basic frequency of the transmit signal to the second transmit frequency.

In other words, it may be provided in the transmit channels, receive channels, and/or transmit/receive channels to use an active frequency-converting high-frequency component as frequency conversion device and/or as receive frequency conversion device. Since the frequency-converting component is an active component, it may be connected to an energy supply. To provide a switching off and on of the transmit signal and/or of the receive signal, a switching of the energy supply may be used. An energy supply can be a voltage source and/or a current source.

According to an embodiment, the antenna device has an evaluation device. The evaluation device is configured to receive the specifiable overall time schedule and/or at least two intermediate frequency receive signals selected from the group of the intermediate frequency receive signals consisting of the first transmit/receive intermediate frequency signal, the at least one second transmit/receive intermediate frequency signal and the receive intermediate frequency signal. Moreover, the evaluation device is configured to determine a receive echo curve for a spatial direction from the specifiable overall time schedule and the at least two intermediate frequency receive signals by the application of a method for digital beamforming. In the evaluation the individual switching behaviour of a corresponding channel may also be taken into account.

The evaluation device may have information about the order of the individual time schedules of the overall time schedule and use this information to evaluate receive signals from the various receive and/or transmit/receive channels correctly, in order to arrive at information about the nature of the surface of an object or of a topology. From this nature of the surface of an object, the evaluation device can arrive at a measuring result, such as a value for a fill level, for example.

According to yet another embodiment, the method for digital beamforming that is applied by the evaluation device may comprise the formation of a virtual co-array or of a virtual array.

According to an embodiment, the antenna device has at least two transmit channels and at least one receive channel, wherein the individual channels are arranged substantially in the form of a line and/or a grid with uniform spacing from one another, in order to form an antenna device, an antenna group, a physical array, or an antenna array.

According to an embodiment, the first transmit frequency, the second transmit frequency, and/or the receive frequency are substantially identical. According to another embodiment, an isolator is arranged between the signal source and at least one of the first frequency conversion devices, the second frequency conversion device, and/or the receive frequency conversion device. According to another example, the transmit element, the receive element, and/or the transmit/receive element may be arranged on a rotating device to determine a spatial orientation. In particular, the antenna device may have a rotating device.

According to an embodiment, the antenna device has a processing device. The processing device can be part of the evaluation device and provide a measured value, e.g., a fill level. According to another embodiment, the antenna device is formed as a two-conductor unit, wherein an energy supply line is also used for data transmission. A two-conductor unit has a two-conductor connection or two-wire connection, wherein the two-conductor connection comprises precisely two electrical lines.

According to an embodiment, a fill level measuring device is specified for determining a fill level and/or for determining a surface structure of an object with an antenna device.

BRIEF DESCRIPTION OF THE DRAWINGS

Other example embodiments are described below with reference to the drawings.

DETAILED DESCRIPTION OF EMBODIMENTS

Figure 1:
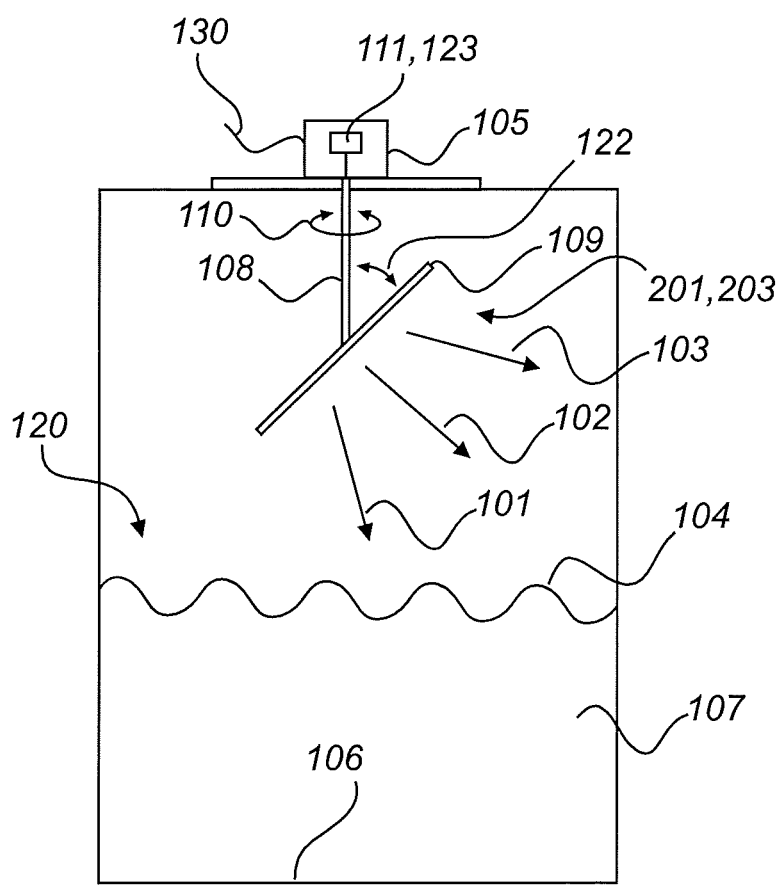
FIG. 1 shows a fill level measuring device with an antenna device according to an embodiment.

The views in the drawings are schematic and not to scale. In the following description of FIG. 1 to FIG. 7, the same reference numerals are used for identical or corresponding elements.

Without restricting the general validity, a linear antenna 201 may generally be discussed in the following description of the drawings. However, the description and principles also apply correspondingly to the two-dimensional array antenna 203 and accordingly to the operating methods.

FIG. 1 shows a fill level measuring device 105 or topology-detecting radar measuring device 105 according to an example embodiment. The measuring device 105 may be a field unit, and is able to detect echo signals or echo curves from different angular ranges 101, 102, 103. The fill level measuring device 105 has a control device 111 and an evaluation device 123 and is supplied with energy via the two-conductor connection 130. The evaluation device 123 has a processing device for providing a measured value. For each echo curve detected, the distance to the respective point of the surface of the bulk material 104 or filling material 104 is determined. The volume of the material heap 107 can be determined by numerical integration of these distance values and by postulating a level surface 106, in particular a level container base 106, under the bulk material 104 or under the filling material 104. The fill level measuring device 105 has the antenna bracket 108 or rotating device 108 with the antenna base 109 for attachment of an antenna 201, 203 or antenna device 201, 203.

In addition or alternatively to a mechanical rotation 110 and/or tilting 122, the main radiation direction 101, 102, 103 of the antenna 201, 203 or antenna device 201, 203 can be supplemented or replaced by methods of digital beamforming. By evaluating the signals received, a receive signal can be formed in the different angular ranges 101, 102, 103 with just one measurement, in order thus to detect the surface 120 of the bulk material 104 at the various angles. By detecting a received beam at the various angles 101, 102, 103, a receive signal can be guided over the surface 120 of the filling material. Methods of digital beamforming (DBF) are used to detect the various spatial regions, and scanning of the surface 120 of the bulk material 104 can be carried out substantially without a mechanical angle adjustment 122 or rotation 110.

Figure 2A:
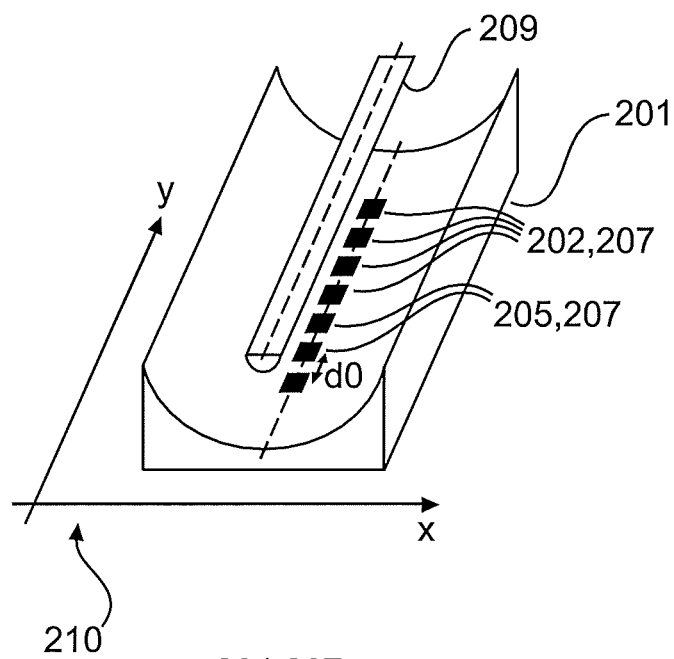
FIG. 2a is a perspective view of a linear parabolic antenna device according to an embodiment.

FIG. 2a is a perspective view of a linear parabolic antenna device 201 with a linear hyperbola 209 according to an example embodiment. The transmit devices 202, 207 and the receive devices 205, 207 are arranged linearly parallel to the y axis shown in FIG. 2a of the coordinate system 210 described by the reference numeral 210. The combination of the transmit devices 202, 207 and receive devices 205, 207 can be described as an antenna group. The individual transmit devices 202, 207 and/or receive devices 205, 207 are spaced at a distance of $d_0$ from one another and are oriented to a grid.

Figure 2B:
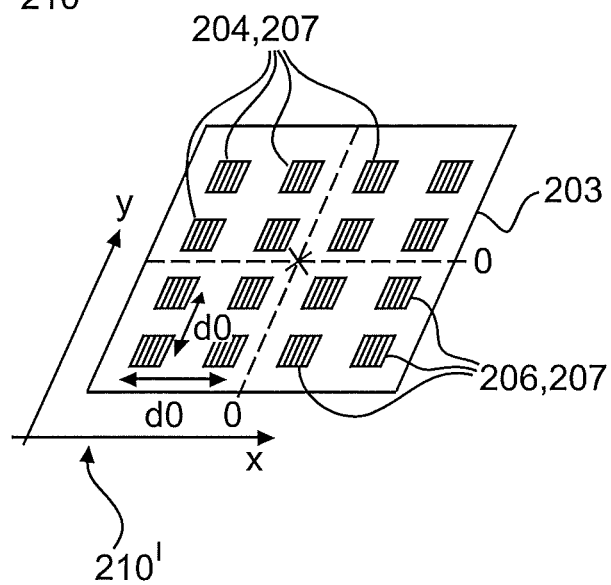
FIG. 2b is a perspective view of a two-dimensional antenna array according to an embodiment.

FIG. 2b shows a two-dimensional (2D) antenna array 203. The two-dimensional antenna array has an extension in two spatial directions, for example in the x direction and the y direction, as indicated by the coordinate system 210'. FIG. 2b shows the arrangement of the transmit devices 204, 207 and the receive devices 206, 207 on the antenna array 203. Instead of pure transmit devices 204 and pure receive devices 206, transmit/receive devices 207 can be used, which can transmit and also receive at the same time at the same position. The individual transmit devices and/or receive devices have a spacing from one another that is smaller than or equal to $d_0 = \lambda$, wherein $\lambda$ indicates the wavelength of the transmit signal and/or of the receive signal. In one example, the spacing can also have the value $\lambda/2$, thus half the wavelength of the transmit signals used.

Figure 3A:
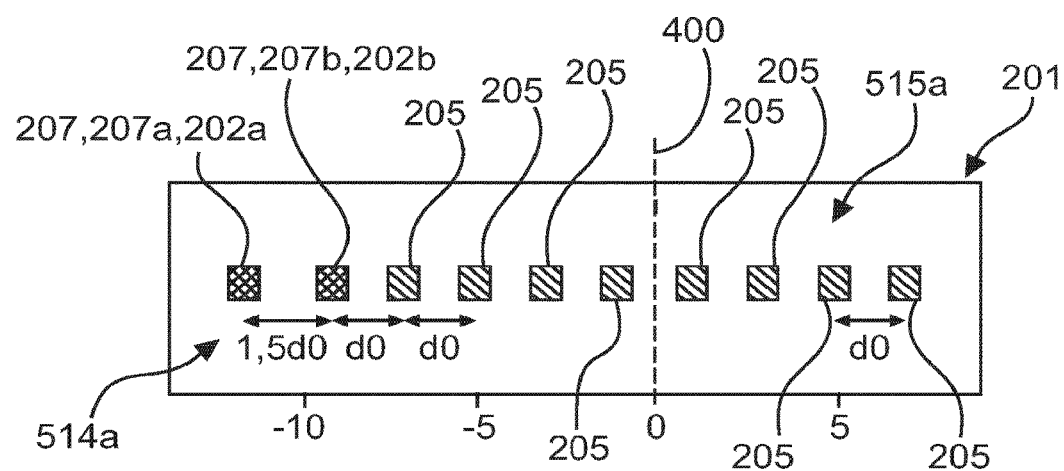
FIG. 3a is a top view of an antenna device with transmit channels and receive channels arranged linearly according to an embodiment.

FIG. 3a shows an antenna device 201 or a MIMO (multiple-input multiple-output) system with linearly arranged transmit channels 202a, 202b and receive channels 205 according to an example embodiment of the present invention. Since transmit/receive channels 207, 207a, 207b can be used both as transmit devices 504 or transmit channels 202, 202a, 202b and as receive devices 504 or receive channels 205, 205a, 205b, they can replace pure transmit devices 202, or pure receive devices 205, as desired. Since transmit channels 202, 202a, 202b and transmit devices 504, 504a'''', 504b'''', 504a''''', 504b''''' (see also FIGS. 4-5) substantially contribute to the generation of a transmit signal, they can generally be termed transmit elements 202, 202a, 202b and the terms can be used similarly for simplification. This may apply similarly to the receive channels 205, 205a, 205b and the receive devices 504, 504c, 504d and also to transmit/receive channels 207. The receive channels can also be termed receive elements or receive devices and the transmit/receive channels can be termed transmit/receive devices or transmit/receive elements.

The antenna device 201 has eight receive channels 205, which are arranged respectively at a spacing $d_0$ in the range of a wavelength $d_0 = \lambda$. Here the receive channels 205 are arranged substantially symmetrically to a reference line 400. A second transmit channel 202b is likewise arranged at a spacing of $d_0 = \lambda$, at the position $-9\lambda/2$ starting out from the reference line 400. The first 202a and the second 202b transmit channel are arranged at a spacing of $1.5\lambda$ from one another. The first and second transmit channel 202a, 202b are formed in each case as a correspondingly controlled transmit/receive channel 207a, 207b. An asymmetric structure overall of transmit channels 202a, 202b, 207a, 207b and receive channels 205 thus results relative to the reference line 400. The transmit channels 202a, 202b, transmit/receive channels 207a, 207b and/or receive channels 205 can be formed as transmit patches. In particular, the transmit device 504, the receive device 504, and/or the transmit/receive device can be formed as a patch. A patch describes a single antenna, which is mounted on a substrate.

In order to avoid grating lobes in the digital beamforming, the distance criterion should be fulfilled, according to which the physical distance between two adjacent antenna elements 202, 204, 205, 206, 207 is to be smaller than or equal to half the wavelength $\lambda/2$ of the radar signals, transmit signals, and/or receive signals used. However, due to this design specification, when realised at high frequencies and with a predetermined physical extension of the antenna or a correspondingly predetermined wide physical aperture, a high number of antenna elements 202, 204, 205, 206, 207 may result and thus a high circuitry outlay, which leads to high manufacturing costs of a radar unit or a fill level measuring device that uses a corresponding antenna device.

Figure 3B:
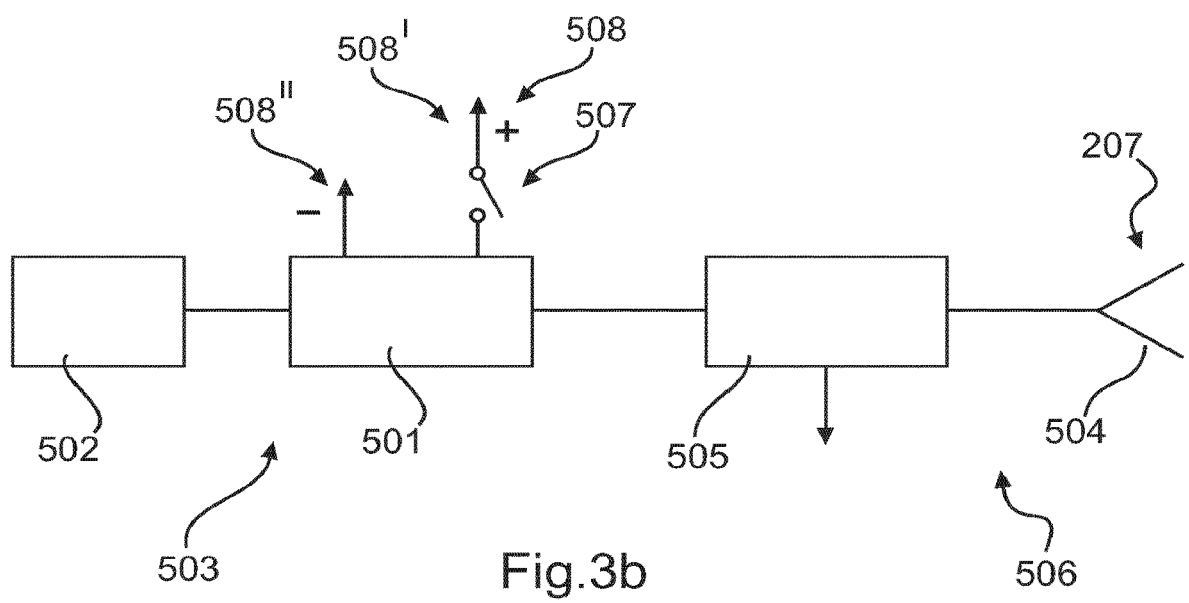
FIG. 3b is a block diagram of a transmit/receive channel according to an embodiment.

FIG. 3b is a block diagram that indicates the general structure of a transmit/receive channel 207 according to an example embodiment. The transmit/receive channel 207 or the transmit channel with a transmit/receive mixing device 505 has a signal source 502 or a VCO (voltage-controlled oscillator) 502. The transmit/receive mixing device 505 can also be termed transmitter/receiver 505 or transceiver 505 on account of the transmit and receive function thereof. The signal source 502 is used to generate a transmit signal with a low basic frequency. The transmit/receive channel 207, which is formed to transmit and receive a signal, is part of an FMCW system 503. In particular, this channel is part of an antenna device 201. The transmit/receive channel 207 uses a six-fold frequency multiplier 501, or frequency conversion device 501. This frequency conversion device 501 receives a transmit signal, which is generated by the VCO 502 or by the signal source 502 with a basic frequency of roughly 13 GHz, placing this low-frequency transmit signal on a transmit signal in the operating frequency range around 79 GHz or on the transmit frequency around 79 GHz. In one example, a frequency ramp of 78.5 GHz to 79.5 GHz can be used. In this case, the value 79 GHz may indicate the centre frequency of the range covered by the frequency ramp. The frequency range is run through regularly and uniformly, so that a regular signal occurs, the frequency of which is increased uniformly over a time curve from 78.5 GHz to 79.5 GHz while it is transmitted. Thus the transmit signal covers a bandwidth of 1 GHz exactly like the reflected receive signal.

In order to generate the frequency ramp, a signal is generated by the VCO with a variable basic frequency in the range between 13.08333 GHz and 13.25 GHz, which is converted by the frequency conversion device to the frequency ramp of 78.5 GHz to 79.5 GHz. The pass band may accordingly have a centre frequency of 79 GHz, also a bandwidth of 1 GHz. Alternatively to a frequency ramp, a transmit signal with a constant frequency can also be used, which is selected from the range from 78.5 GHz to 79.5 GHz. A transmit signal can be used accordingly with a constant frequency that is selected from the range 13.08333 GHz to 13.25 GHz. In another example the transmit signal can be sent with a constant frequency or a variable frequency ramp, which is selected from the W-band. The W-band is a frequency band defined in high-frequency technology that lies in the range between 75 GHz and 110 GHz.

The six-fold frequency multiplier 501 or frequency conversion device 501 multiplies the basic frequency of the transmit signal generated by the VCO 502 by a constant factor, for example by the factor 6, in order to generate, for example when using an FMCW (frequency-modulated continuous-wave) signal from the frequency ramp around 13 GHz, which is produced by the signal source 502 and a PLL (phase-locked loop) not shown in FIG. 3b, a frequency ramp around 79 GHz, for example from 78.5 GHz to 79.5 GHz. In FIG. 3b, the signal propagation of a transmit signal runs from left to right, from the signal source 502 to the transmit/receive section 506, which has the antenna 504 or the transmit device 504 and the transceiver 505. The transmit/receive channel 207 shown in FIG. 3b is able to mix the frequency ramp provided by the signal source 502 around 13

GHz, for example in the range between 13.08333 GHz and 13.25 GHz, with the six-fold-increasing frequency conversion device 501 or the six-fold-increasing multiplier 501 up to a frequency range in the W-band. The transmit/receive channel 207 can be switched on and off following a time schedule, in that the energy supply 508 is switched on and off by a switching device 507, in order to control a time-controlled conversion of the basic frequency of the signal source 502 in this way, for example the conversion of the basic frequency of 13 GHz to the transmit frequency of 75 GHz. The switching device 507 is integrated into the positive energy supply connection 508', 508", in order to switch an energy supply to the active frequency conversion device 501 on and off according to the time schedule or to interrupt it by means of the switching device 507.

A time-controlled conversion of the basic frequency of the transmit signal to the transmit frequency can thus be achieved by the time-controlled switching on and off of the switching device 507 and consequently a time-controlled transmission by the transmit/receive channel 207 can be executed without having to resort to HF switches. A similar explanation applies to pure transmit channels 202, 202a, 202b and pure receive channels 205.

Figure 3C:
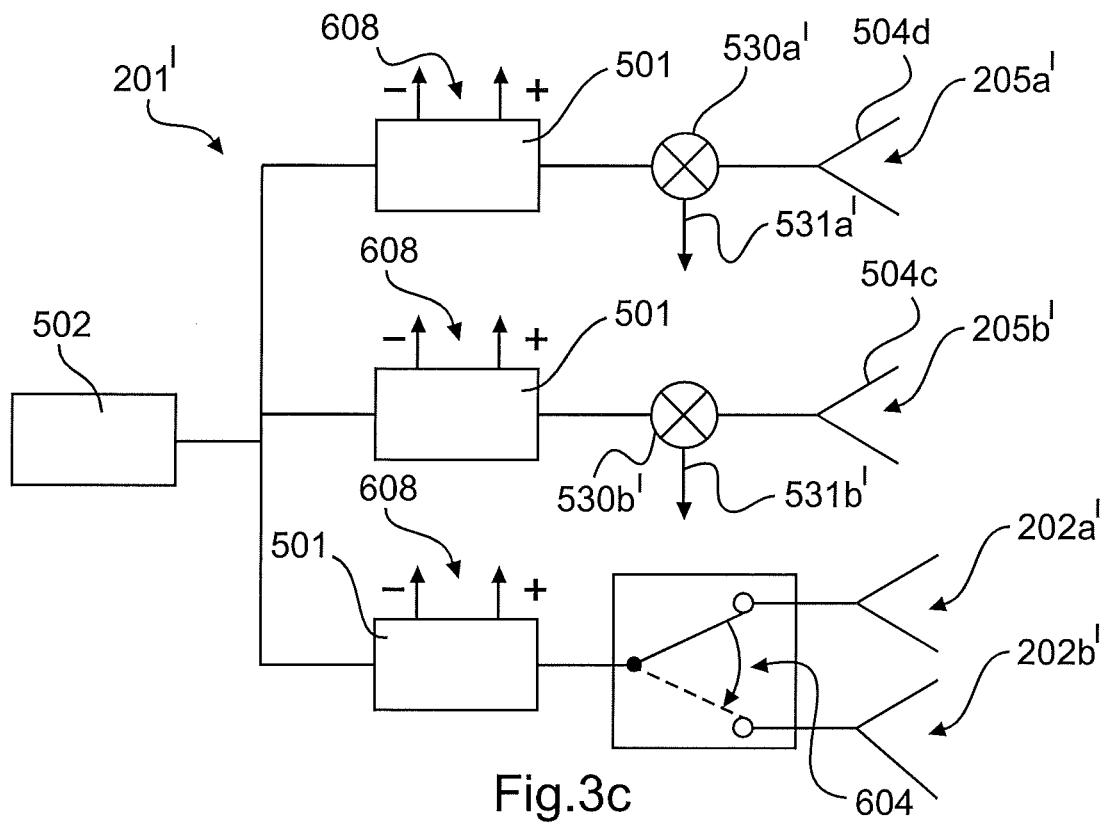
FIG. 3c is a block diagram of an antenna device with an HF changeover switch for the transmit channels according to an embodiment.
Figure 3D:
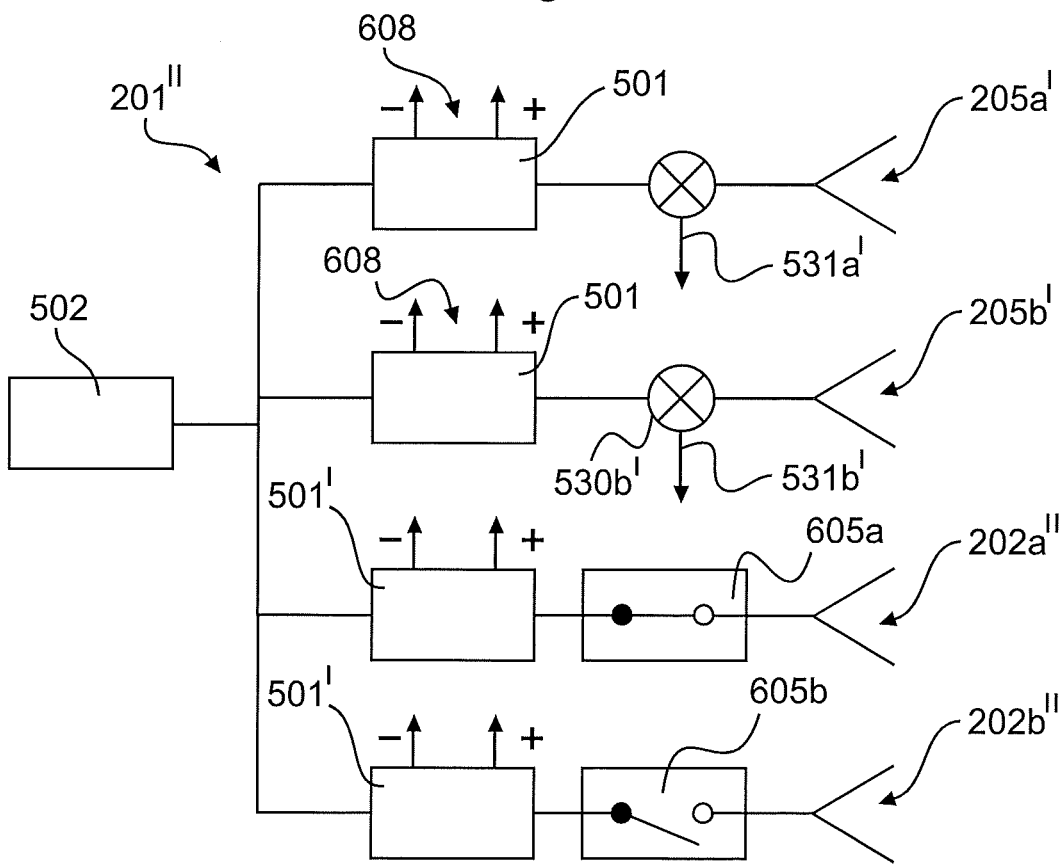
FIG. 3d is a block diagram of an antenna device with individual high-frequency switches assigned to each transmit channel according to an embodiment.
Figure 3E:
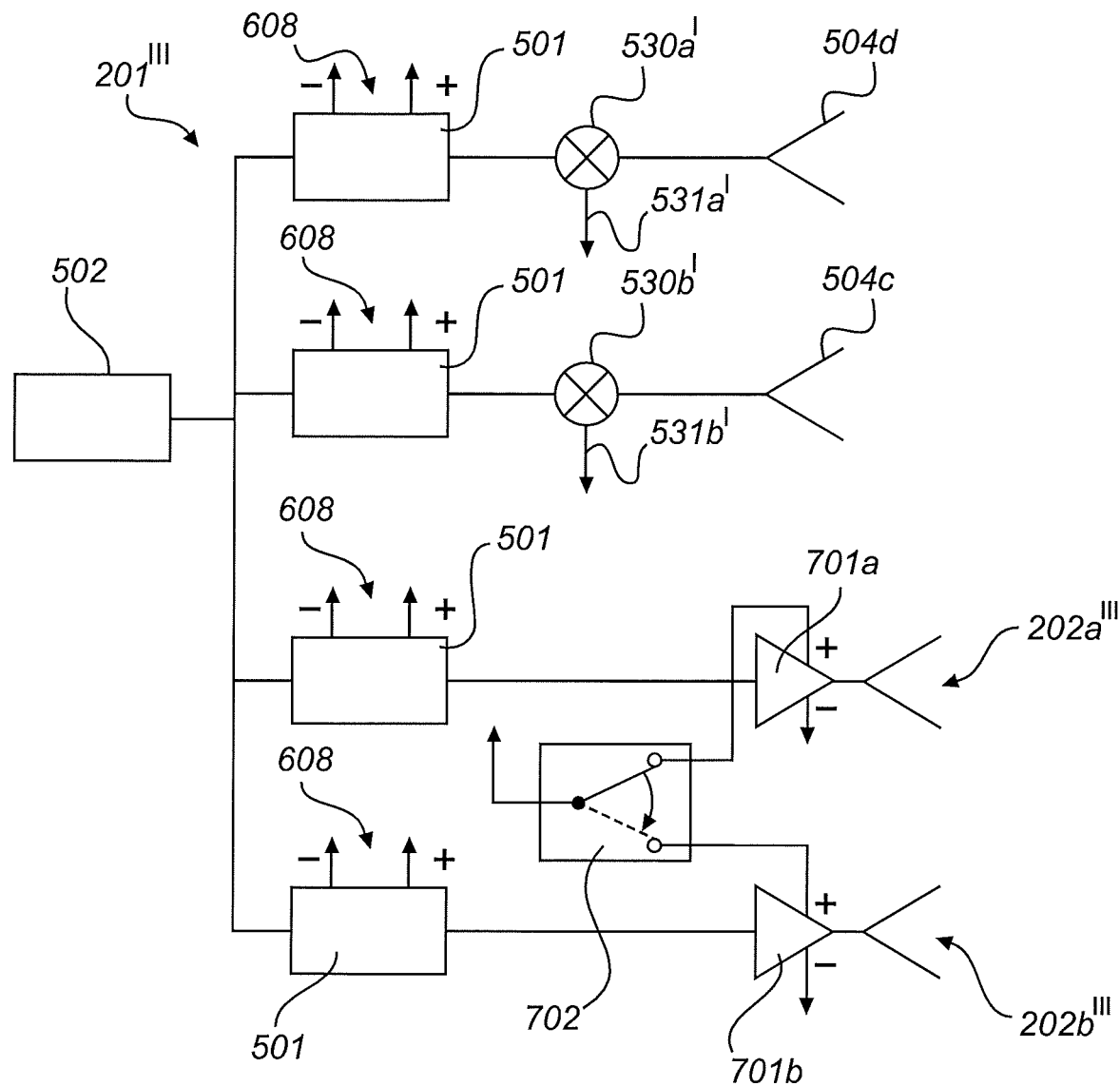
FIG. 3e is a block diagram of an antenna device with switched transmit amplifiers according to an embodiment.

FIG. 3c shows the structure of transmit channels 202a', 202b' and receive channels 205a', 205b' with a changeover switch 604 according to an example embodiment. FIG. 3d shows an antenna device 201" with a high-frequency switch respectively in each transmit channel 202a", 202b" according to an example embodiment. FIG. 3e shows an antenna device 201'", in which a time-controlled activation of the transmit channels 202a'", 202b'" by switched transmit amplifiers 701a, 701b is realised according to an example embodiment.

Figure 4:
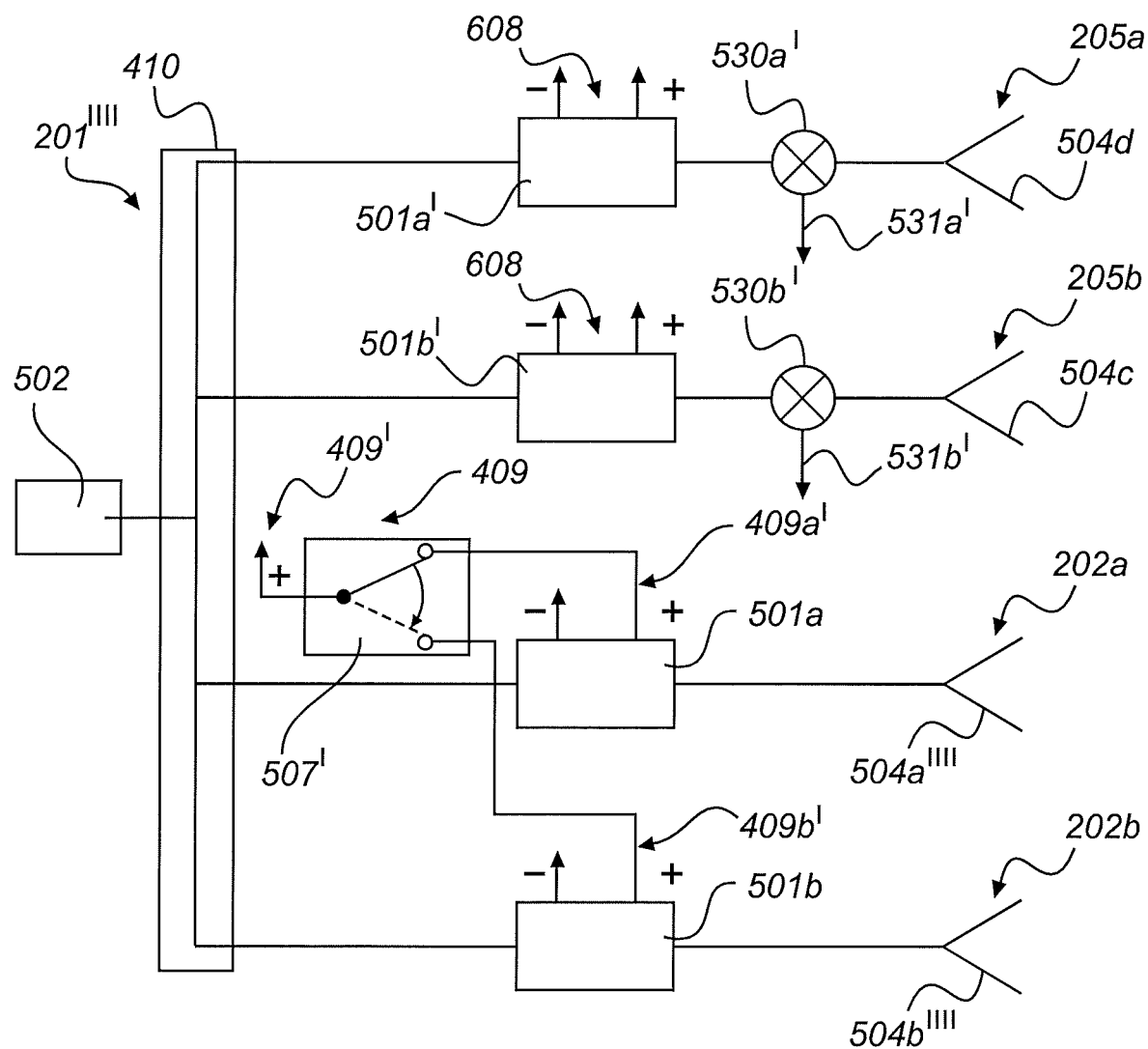
FIG. 4 is a block diagram of an antenna device with a time-controlled frequency conversion device according to an embodiment.

FIG. 4 shows an antenna device 201"" or a MIMO system with a frequency conversion device 501a, 501b, which is configured for a time-controlled conversion of a basic frequency of a transmit signal to a transmit frequency in a frequency pass band of a transmit device 504a"", 504b"", according to an example embodiment. The receive channels 205a, 205b are constructed like the receive channels in FIG. 3c and have the receive frequency conversion devices 501a', 501b', which are connected permanently to an energy source 608. The receive frequency conversion device 501a', 501b' passes a frequency-increased local oscillator signal to the receive mixing device 530a', 530b', in order to mix down a receive signal received via the receive device 504c, 504d into an IF (intermediate frequency) signal. To generate the local oscillator signal in the frequency range suitable for the operation of the receive mixing device 530a', 530b' for mixing, a signal with a multiplied basic frequency is provided by the receive frequency conversion device 501a', 501b'. If the receive mixing device 530a', 530b' is provided via the receive frequency conversion device 501a', 501b' with a signal with a sufficiently high local oscillation frequency, a receive signal that is received via the receive device 504c, 504d can be mixed down to an IF signal or receive intermediate frequency signal. The receive frequency mixing device 530a', 530b' provides the IF receive signal via the output 531a', 531b' or the IF output 531a', 531b'. This IF signal can be evaluated in an evaluation device and/or in a processing device, which is not shown in FIG. 4.

The transmit signal that the signal source 502 generates is distributed via the distribution network 410 or LO distribution network 410 to the respective receive channels 205a, 205b or transmit channels 202a, 202b. The transmit signal is provided in particular to the receive frequency conversion devices 501a', 501b' and frequency conversion devices 501a, 501b of the transmit channels. A transmit/receive channel 207, 207a, 207b can also be supplied similarly with the low-frequency transmit signal. A positive supply connection of the frequency conversion devices 501a', 501b' of the first transmit channel 202a and the second transmit channel 202b can be connected to a positive connection 409' of an energy supply via the low-frequency (LF) switch 507'. Energy supply 409 to connection 409' can be the same energy supply 409, 608 in one example that is also used for the frequency conversion devices 501a', 501b', 501a, 501b. A time-controlled transmit signal can be generated by switching the energy supply lines 409a', 409b'. The LF switch 507' can be controlled by a time-division multiplex method and can ensure the time-controlled conversion of the basic frequency to the transmit frequency according to the activation rhythm. Since the LF switch 507' is executed as a changeover switch 507', it is ensured that only one transmit channel 202a, 202b is ever active at the same time. The frequency conversion devices 501a, 501b are also connected to negative connections 409b', 409b" of the energy supply 409.

Figure 5:
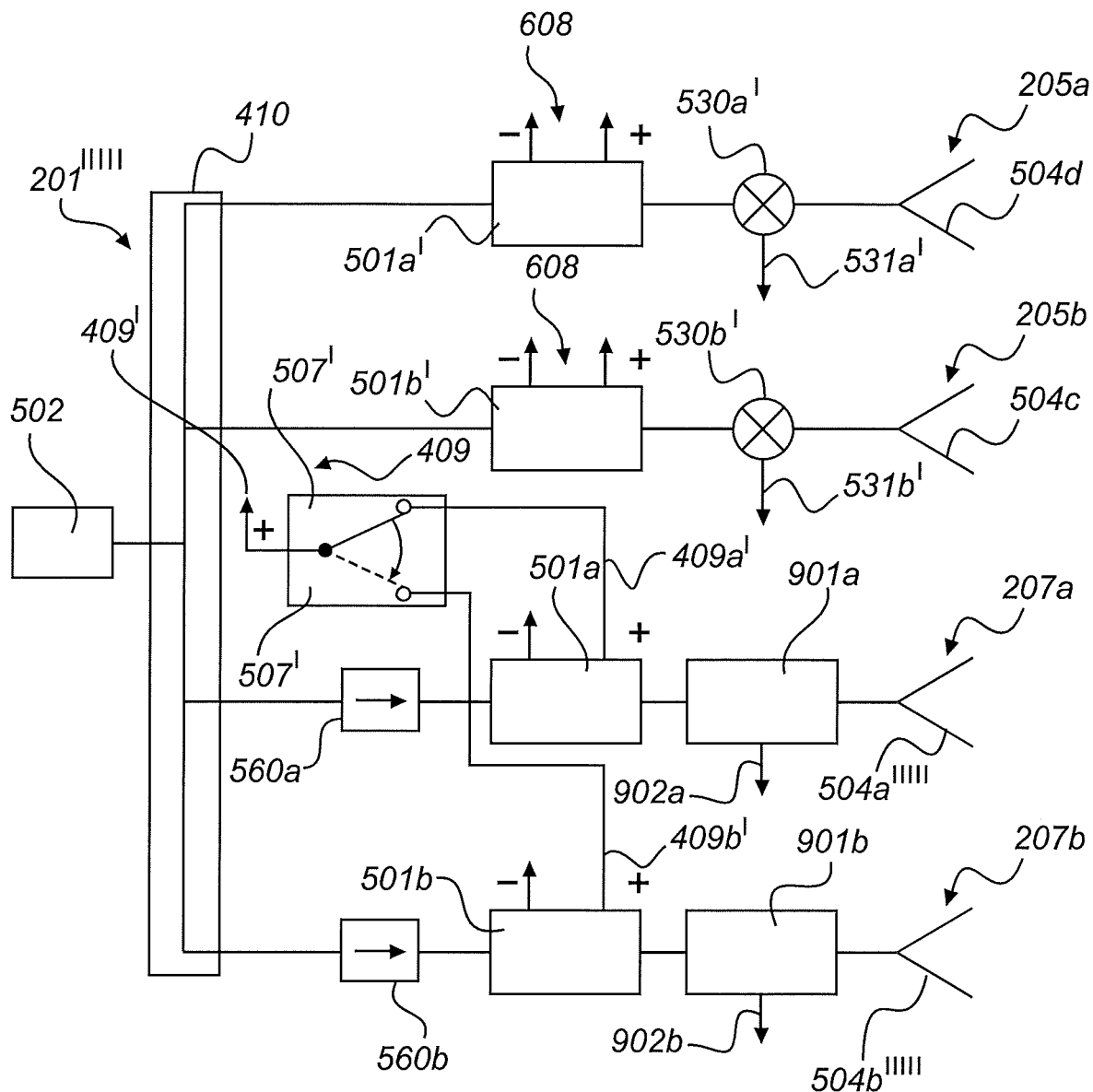
FIG. 5 is a block diagram of an antenna device with transmit/receive channels according to an embodiment.

FIG. 5 shows the structure of an antenna device 201""' with transmit/receive channels 207a, 207b according to an example embodiment. In addition to the first frequency conversion device 501a of the first transmit/receive channel 207a, a transmit/receive mixing device 901a is provided, which makes it possible to transmit and receive signals via the antennas 504a""', 504b""' or the transmit devices 504a""', 504b""'. To facilitate simultaneous transmitting and receiving, the transmit/receive mixing device 901a, 901b is connected in each case to a frequency conversion device 501a, 501b, which ensures in turn a time-controlled activation of the frequency conversion device 501a, 501b via the switchover device 507'. A transmit signal can be sent and a receive signal, which has arisen by reflection from the transmit signal, can be received by means of the transmit/receive channel 207a, 207b. The transmit devices 504a""', 504b""' are configured for bidirectional operation in the frequency pass band. The receive signal can be provided at the outputs 902a, 902b of the transmit/receive mixing devices 901a, 901b as an IF (intermediate frequency) receive signal. In addition to receiving by means of the transmit/receive channels 207a, 207b, receiving can also take place using the pure receive channels 205a, 205b.

Arranged between the signal source 502 and the frequency conversion devices 501a, 501b of the transmit/receive channels 207a, 207b are isolators 560a, 560b. These isolators 560a, 560b can prevent signals from being reflected back into the signal source 502 if one of the frequency conversion devices 501a, 501b is separated by the switchover device 507' from the energy supply 409. An isolator or high-frequency isolator 560a, 560b forwards an electromagnetic signal only in one direction, for example from the signal source 502 to the frequency conversion device 501a, 501b. For example, an isolator can prevent the first receive signal, the second receive signal, and/or the receive signal from reaching the signal source and/or the other transmitters and/or receivers respectively.

The offsetting or processing of the individual receive channels 205a, 205b and/or the transmit/receive channels 207a, 207b is carried out according to methods for forming virtual co-arrays, due to which a widening of the aperture of the physical antenna device 201, 201"", 201""' results.

In the following, transmit channels 202, 202a, 202b, receive channels 205, 205a, 205b, and/or transmit/receive channels 207, 207a, 207b are represented by their signal paths or energy distributions of their signals. For the sake of simplicity, the descriptions of the physical channels are also used equivalently for these signal paths.

Figure 6A:
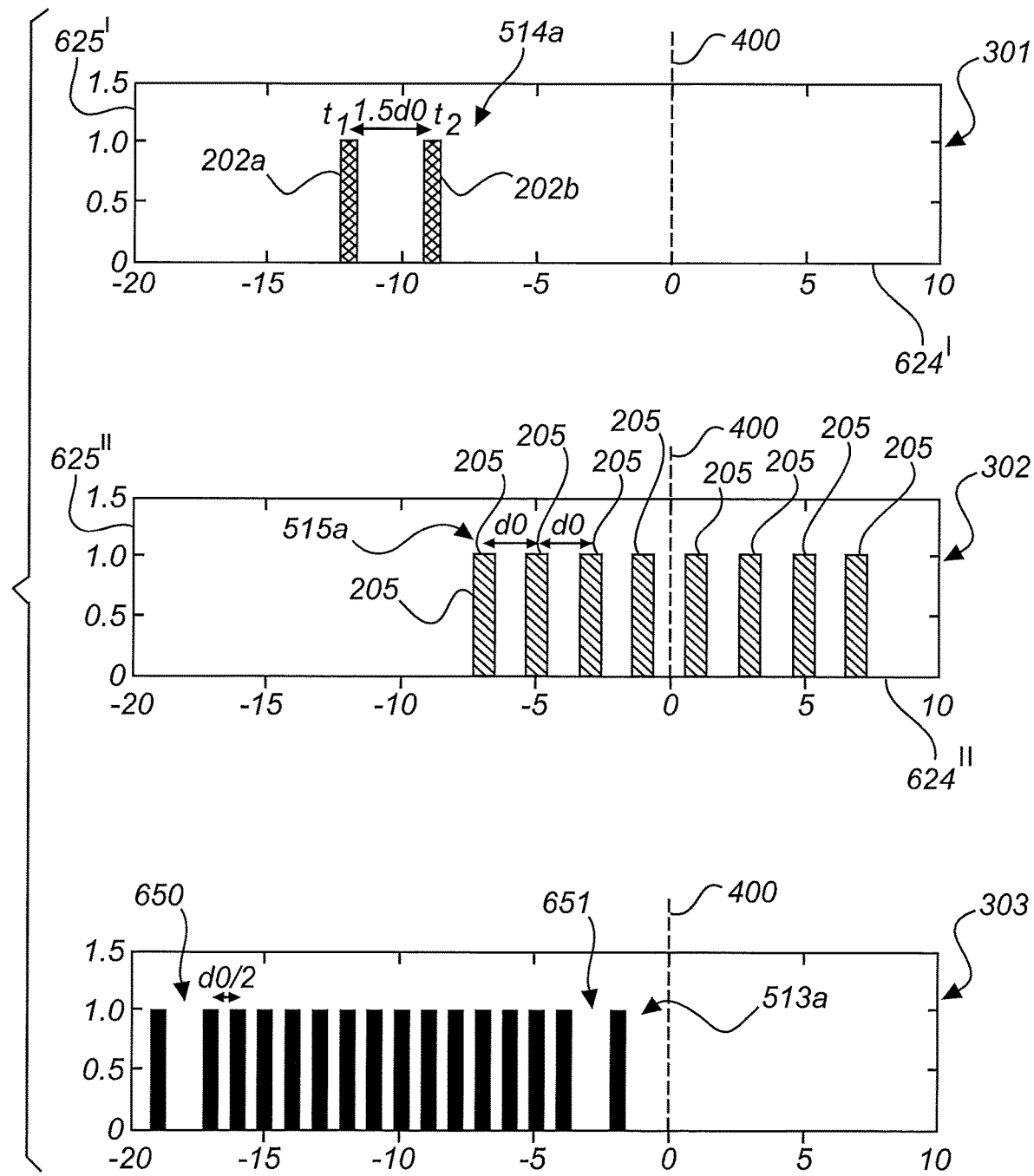
FIG. 6a is a simulation diagram for the formation of a virtual co-array according to an embodiment.

FIG. 6a is a simulation diagram to represent a virtual co-array 513a according to an example embodiment of the present invention. In the simulation diagram, the transmission diagram 301 shows the impacting of a transmit channel 202, 202a, 202b, 207 of an antenna device 201 with a transmit signal at different times t1, t2. The ordinate 625' of the transmission diagram 301 indicates the weighting of a transmit signal, which acts on either a transmit channel and/or on a transmit/receive channel 207. The abscissa 624' indicates a local distribution of a position of a transmit channel 202a, 202b, 207, 207a, 207b within the array 201 or the transmit device 201. Just as a reference line 400 is assumed for determining the positions of the individual channels in FIG. 3a for the antenna device 201, positions in the simulation diagrams 301, 302, 303 are related to the reference line 400. The abscissa 624' is related to the magnitude $\lambda/2$.

Since the transmit signals 202a, 202b represented in the transmission diagram 301 are the outputs of transmit channels 202a, 202b, 207a, 207b, the transmit signal shown in the transmission diagram 301 can also be described as transmit channel 202a, 207a, 202b, 207b. The first transmit channel 202a is located at the position $-12\lambda/2$ and the second transmit channel 202b is located at the position $-9\lambda/2$. The receive signals or receive channels 205 are represented correspondingly in the receiving diagram 302. As in FIG. 3a, the receive channels are located at the positions $-7\lambda/2$, $-5\lambda/2$, $-3\lambda/2$, $-1\lambda/2$, $+1\lambda/2$, $+3\lambda/2$, $+5\lambda/2$ and $+7\lambda/2$. A weighting of the receive signal is given on the ordinate 625" in the receiving diagram 302 also. The abscissa 624" indicates in turn the position of the receive channels 205 relative to $\lambda/2$.

The transmit signals from the transmission diagram 301 can be calculated with the receive signals from the diagram 302 in such a way that the calculated virtual co-array 513a shown in the co-array diagram 303 results. To get from the transmit signals 301 and receive signals 302 to the virtual co-array 513a in the co-array diagram, the method is applied of discrete convolution of the positions of the transmit channels 202a, 207a and thus of the positions of the signals provided by these channels and of the positions of the receive channels 205, which are shown in the receiving diagram 302. The co-array 513a has an aperture or width that extends from $-19\lambda/2$ to $-2\lambda/2$. The spacings of the individual array elements of the virtual co-array 513a substantially amount to $\lambda/2$ or $d_0/2$ and at the points $-18\lambda/2$ and $-3\lambda/2$ have the gaps 650 and 651. The co-array 513a can be understood as the aperture of a calculated receive array that would result if only a single transmit channel were to be located in the middle of the receive channels 205, i.e., if only one transmitter were to be located on the reference line 400.

The signals of the transmit channels 202a, 202b shown in the transmission diagram 301 can be understood as a transmit array 514a. The receive channels 205 from the receiving diagram 302 can be understood as a receive array 515a. The virtual array 513a has a larger aperture compared to the physical array 201 or to the physical antenna device 201, which has the transmit array 514a and the receive array 515a. The physical array 201 extends from $-12\lambda/2$ to $+7\lambda/2$ and thus has a width of $19\lambda/2$. The virtual array 513a extends from $-19\lambda/2$ to $-2\lambda/2$ and thus has an aperture of $17\lambda/2$, wherein the aperture of the virtual array 513a is more densely populated.

Discrete convolution is possible in that the transmission of the transmit signals 202a, 207a, 202b, 207b takes place at different times t1, t2. The temporally offset transmission can be realised by high-frequency switches 604, 605a, 605b or switched transmit amplifiers 701a, 701b, 702. It is ensured in this case by switching over or switching on/off that the different transmit channels 202a, 202b, 202a', 202b', 202a'', 202b'', 202a''', 202b''', 207a, 207b are active at different times and thus the transmit signal is switched back and forth between two antennas. Switching of the frequency conversion devices 501a, 501b, 501 by switching device 507' can prevent the use of expensive and complex high-frequency switches.

Figure 6B:
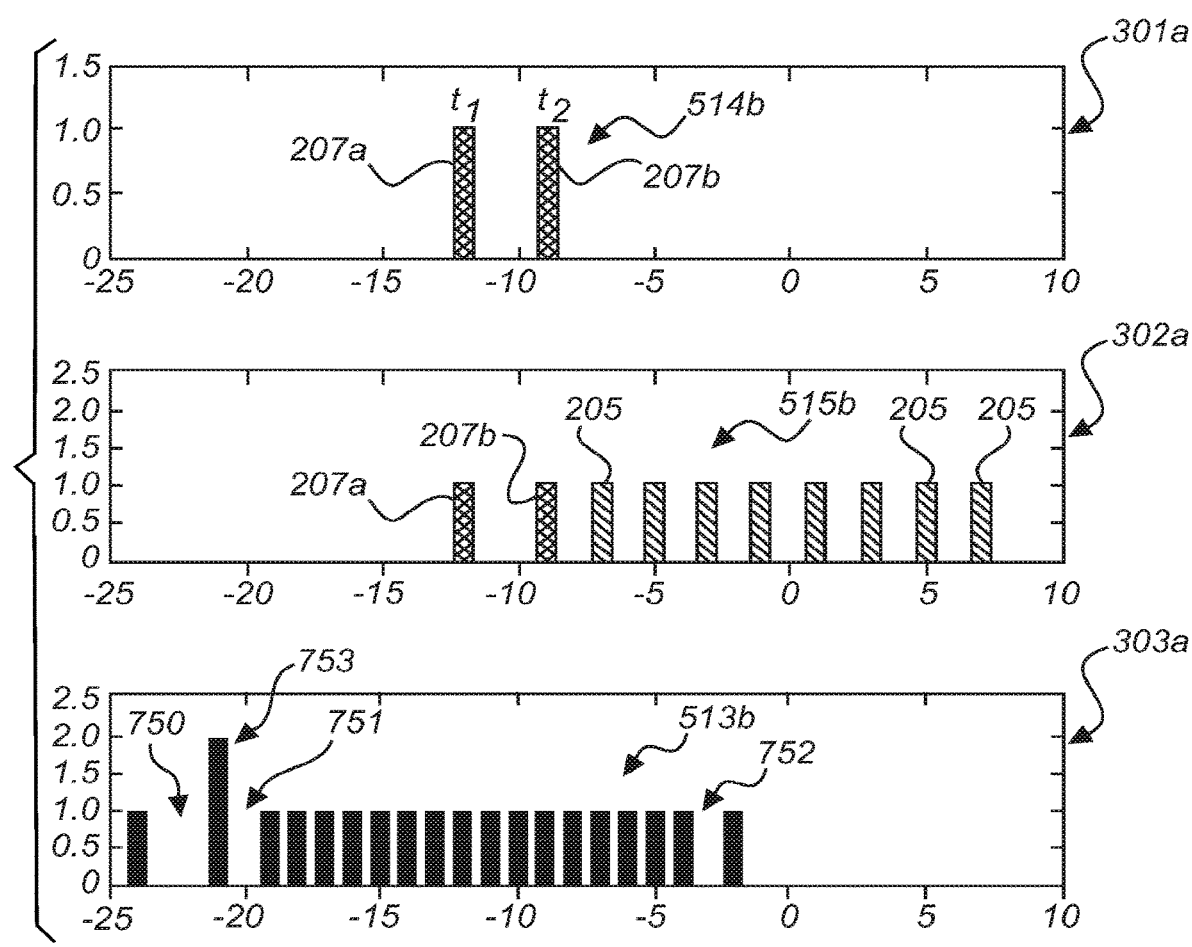
FIG. 6b is a simulation diagram for the formation of a virtual co-array, wherein transmit channels are used as transmit/receive channels, according to an embodiment.

FIG. 6b shows a simulation result of an antenna device with switched frequency multipliers 501a, 501b, wherein transmit channels are used as transmit/receive channels 207a, 207b, according to an example embodiment of the present invention. Due to the fact that at least a portion of the transmit channels 202a, 202b can also be used for receiving, receive signals from the transmit stages also can be received in addition to the pure receive signals that are detected via the receive channels 205a, 205b. As the number of receive channels can be increased in this way, larger or densely populated virtual antenna apertures can be constructed. In FIG. 6a the transmission diagram has pure transmit channels 202a, 202b and the receiving diagram 302 has pure receive channels 205, wherein the number m of the transmitters is equal to 2 and the number n of the receivers is equal to 8. The virtual co-array 513a results with m×n=16 elements. FIG. 6a and in particular the co-array diagram 303 thus show a co-array 513a, which can be generated with a temporally switchable antenna device 201'''' from FIG. 4.

If transmit/receive channels 207a, 207b are provided, as shown in FIG. 5, the co-array 513b shown in FIG. 6b can be formed. The transmission diagram 301a shows the m=2 transmit/receive channels 207a, 207b, which can be used for transmission at the alternating times t1 and t2. As the transmit/receive channels 207a, 207b can also be used for receiving transmitted signals, they also contribute to the formation of the receive array 515b shown in receiving diagram 302a. The transmit array 514b is formed by the transmit/receive channels 207a, 207b. The co-array diagram 303a represents the virtual array 513b formed by the antenna device 201'''' with transmit/receive channels 207a, 207b. Compared with the width of the antenna array 513a from FIG. 6a, which is produced in the case of pure transmit channels 202a, 202b and pure receive channels 205 and extends from $-2\lambda/2$ to $-19\lambda/2$, the aperture of the co-array 513b has widened on account of the receive signals 207a, 207b additionally present in the receive array 515b. The aperture of the virtual co-array 513b extends from $-24\lambda/2$ to $-2\lambda/2$. However, the virtual co-array 513b has the aperture gaps 750, 751, 752 and the signal increase 753 with a double weighting. The double weighting is an antenna element that occurs at the position $-21\lambda/2$ and has a weighting with factor 2. The double weighting arises due to the convolution used in the formation of the virtual co-array 513b. At this position $-21\lambda/2$ two antenna elements are displayed at a single position due to the convolution. In the depiction, two receivers 205, 207a, 207b supply an identical signal and thus the same information. This superposition of signals can occur if the signal from the receiver 207b at the position $-9\lambda/2$ during the transmission of transmitter 207a at the position $-12\lambda/2$ at time t1 and the signal from the receiver 207a at the position $-12\lambda/2$ during the transmission of transmitter 207b at the position $-9\lambda/2$ at time t2 are identical. Consequently a signal then exists that is present twice and increases in the calculated co-array 513*b* by the factor 2. Since due to the use of transmit/receive channels the transmit array 514*b* has m=2 transmit channels 207*a*, 207*b* and the receive array 515*b* has m=2 transmit/receive channels 207*a*, 207*b* and n=8 pure receive channels 205, a virtual co-array 513*b* results with m×(m+n) signals, thus 20 signals, wherein the superposition of two signals makes itself noticeable in the signal increase 753. At the position $-21\lambda/2$ a plurality of receivers are depicted in the co-array 513*b*.

Since a transmit/receive mixing device 901*a*, 901*b* requires a frequency-multiplied input signal to have a local oscillator, but the frequency multipliers 501*a*, 501*b* also have interruption breaks according to the time schedule during which no transmit signal is generated, the receive signals follow this schedule also. Consequently no receive signals can be formed even during the transmit breaks. In the case of a transmit break of a transmitter, the associated receiver can thus likewise not receive, as it lacks a local oscillator signal on account of the switched-off frequency multiplier 501*a*, 501*b*.

Figure 6C:
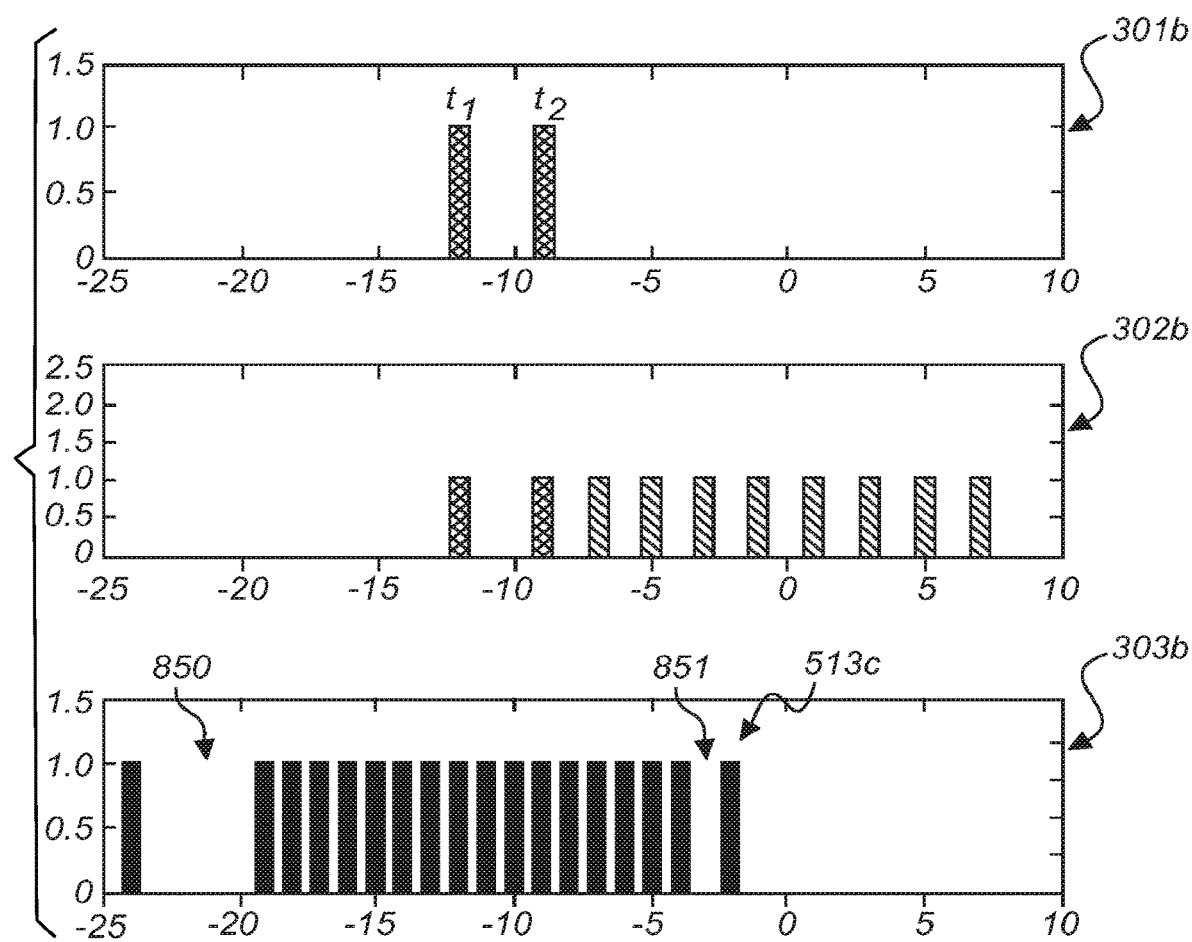
FIG. 6c is a simulation diagram for the formation of a virtual co-array taking account of an adaptive convolution kernel according to an embodiment.

The co-array 513*b* is formed by transmit/receive channels 207*a*, 207*b*, which are switched on and off consecutively in time, for example at the times t1, t2. When forming a virtual co-array 513*b*, the existing receive breaks can be taken into account by methods of digital signal processing. FIG. 6*c* shows simulation diagrams for forming a virtual co-array 513*c* taking account of an adaptive convolution kernel according to an example embodiment of the present invention. The transmit signals 301*b* in FIG. 6*c* correspond to the transmit signals in FIG. 6*b*. The receive signals 302*b* in FIG. 6*c* correspond to the receive signals 302*a* in FIG. 6*b*. When forming the convolution sum from the transmit signals 301*a*, 301*b* and receive signals 302*a*, 302*b*, the convolution kernel can be changed adaptively depending on which receivers 207*a*, 207*b* are deactivated at the transmit time t1, t2. By forming the convolution sum with an adaptive convolution kernel, an aperture of m×n+m antenna elements 513*c* can be emulated, which extends in FIG. 6*c* from $-24\lambda/2$ to $-2\lambda/2$ and no longer has the signal increase 753. The virtual co-array 513*c*, which was formed by a discrete convolution with an adaptive convolution kernel, has only two aperture gaps 850, 851. The convolution kernel is used in a discrete convolution and must be adapted if transmit receivers 207, 207*a*, 207*b* or transmit/receive channels 207, 207*a*, 207*b* that cannot always receive are used. The discrete convolution is a sum over a multiplicity of elements 207, 207*a*, 207*b*, 205, for example k elements. The formation of the virtual array 513*c* has the calculation of the discrete convolution of the discrete transmit and receive vectors. The transmit and receive vectors used in this discrete convolution correspond to the positions of the transmit and receive elements 202, 202*a*, 202*b*, 205, 207, 207*a*, 207*b*. The vector of the receive array 515*b* is adapted for each summand of the convolution operation, as this vector is not the same for every transmission at every time t1, t2 due to transmit/ receive devices 207, 207*a*, 207*b* that may be switched off. The adaptive convolution kernel can therefore be understood as an adaptive matching of the convolution kernel to the convolution operation.

Side lobes, which arise in an antenna diagram resulting from the co-array 513*b*, 513*c*, can be strongly damped due to the elimination of signal increases 753. Window functions can also be used to improve the antenna diagram. These window functions can be applied to the weighting factors of the co-array 513*c* to damp the side lobes further. For example, a window function can provide for co-array elements of the virtual co-array 513*b*, 513*c* at the edge of the co-array, e.g. in the area of $-24\lambda/2$ and $-2\lambda/2$, to be weighted more weakly than the elements in the middle of the co-array in the area of, for instance, $-12\lambda/2$. For the weaker weighting a weighting factor can be used, for example, that is smaller than 1 (<1).

It is true that more antenna elements are contained in the co-array 513*b* in the same aperture than in the co-array 513*c* due to the signal increase 753, since it is taken into account in the case of the aperture of co-array 513*c* that the receivers of the transmit/receive devices that are switched off in transmit breaks cannot receive and signals that can lead to a signal increase are left out. However, the uniformly weighted co-array 513*c* can substantially avoid the presence of weighting jumps in the co-array diagram 303*b* in further signal processing following the co-array formation. The outlay on signal post-processing can therefore be reduced, for example, if it is provided for every co-array element of the co-array 513*c* to be weighted with the factor 1, as shown in the co-array diagram 303*b* in FIG. 6*c*. If co-array elements are weighted with the factor 2, as in the case of a signal increase 753, the signal processing can provide, for example, for the formation of the mean value from both signals of the signal increase 753 or for the omission of the signal of a channel with the signal increase 753, in order to reduce the signal increase.

The number of antenna elements 513*c* is formed according to the formula m×n+m, if there are transceivers 207 that cannot receive while they are not transmitting. This formula results from the multiplication of the number m of transmit elements 207*a*, 207*b* and the number n of pure receive elements 205 and the number of additional receive elements 207*a*, 207*b*, which arise when transceivers are used that cannot receive while they are transmitting. In the case of FIG. 6*c*, there are m=2 transmitters from the transmission diagram 301*a*, 301*b* and n=8 pure receivers. Added to these are two receive signals by the transceivers 207*a*, 207*b*. If the first transmitter 207*a* is active at time t1, its associated receiver 207*a* can receive at time t1 also; if the second transmitter 207*b* is active at time t2, its associated receiver 207*b* can receive at time t2 also. At time t1 the second transmitter 207*b* and thus also the second receiver 207*b* are deactivated and not included in the calculation. At time t2 the first transmitter 207*a* and thus also the first receiver 207*a* are deactivated and not included in the calculation. The co-array 513*c* accordingly has 2×8+2=18 elements.

Figure 7:
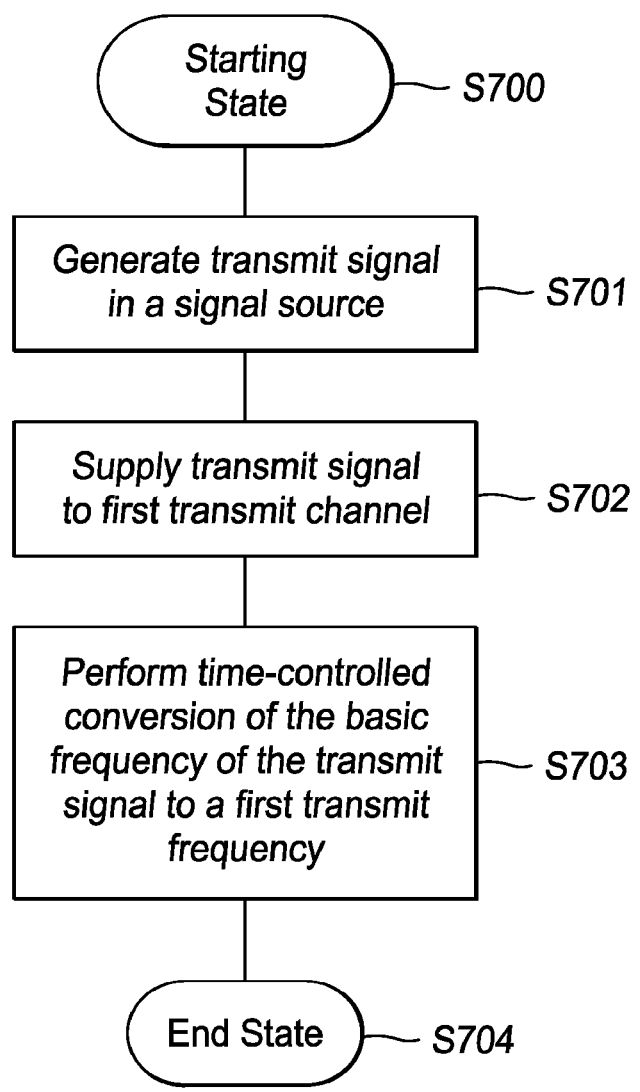
FIG. 7 is a flow chart for a method for transmitting and/or receiving a signal according to an embodiment.

FIG. 7 is a flow chart for a method for transmitting and/or receiving a signal according to an example embodiment. The method starts in a starting state S700. In a step S701, a transmit signal with a specifiable basic frequency is generated in a signal source. In step S702, the transmit signal is supplied to a first transmit channel 202*a*, which has a first frequency conversion device 501*a* and a first transmit device 504*a''''*. The transmit device 504*a''''* or antenna 504*a''''* has a first frequency pass band. In step S703, time-controlled conversion of the basic frequency of the transmit signal to a first transmit frequency takes place. The first transmit frequency lies in a first frequency pass band of the first transmit device 202*a*. The conversion of the basic frequency to the first transmit frequency takes place, in order to provide a first transmit signal with the first transmit frequency via the first transmit channel 202*a*. In one example, the basic frequency may be 13 GHz and the first transmit frequency 79 GHz.

The conversion of the basic frequency of the transmit signal to the first transmit frequency, which lies in the first frequency pass band, is carried out according to a specifiable time schedule. This time schedule is implemented by activation of a switching device 507', so that a periodic signal is provided according to the first time schedule via the first transmit channel 202a. The method ends in the end state 704.

We claim:

1. An antenna device for a multiple-input multiple-output fill level radar unit, which operates according to a frequency-modulated continuous-wave principle and a time-division multiplexing method, comprising:
    a signal source comprising a single phase-locked loop configured to generate a transmit signal with a basic frequency;
    a control device comprising a switching device;
    a plurality of transmit channels comprising a first transmit channel, comprising:
        a first frequency conversion device, and
        a first transmit device with a first frequency pass band,
    wherein the signal source is connected to the first frequency conversion device,
    wherein the switching device is connected to the first frequency conversion device, and is configured to perform time-controlled switching on and off of the first frequency conversion device and time-controlled conversion of the basic frequency of the transmit signal to a first transmit frequency, which lies in a first frequency pass band of the first transmit device, in order to provide via the first transmit channel a first transmit signal with the first transmit frequency, and
    wherein the conversion of the basic frequency of the transmit signal to the first transmit frequency, which lies in the first frequency pass band, is carried out according to a specifiable first time schedule according to the time-division multiplexing method;
    at least one second transmit channel, comprising:
        a second frequency conversion device, and
        a second transmit device with a second frequency pass band,
    wherein the signal source is further connected to the second frequency conversion device of the respective at least one second transmit channel,
    wherein the control device is connected to the second frequency conversion device, which is further configured to perform time-controlled conversion of the basic frequency of the transmit signal to at least a second transmit frequency, which lies in a second frequency pass band of the second transmit device of the respective at least one second transmit channel, in order to provide a second transmit signal with the second transmit frequency via the at least one second transmit channel,
    wherein the conversion of the basic frequency to the second transmit frequency is carried out according to at least one specifiable second time schedule,
    wherein the control device is further configured to combine the specifiable first time schedule and the at least one specifiable second time schedule to a specifiable overall time schedule, and
    wherein the control device is further configured to provide the specifiable overall time schedule.

2. The antenna device according to claim 1,
    wherein at least one of the first transmit channel and the at least one second transmit channel comprises a transmit/receive mixing device connected to the first frequency conversion device of the first transmit channel and/or to one of the second frequency conversion devices of the respective at least one second transmit channel, in order to receive a first receive signal with the first transmit frequency and/or at least one second receive signal with the second transmit frequency, and
    wherein the transmit/receive mixing device is configured to provide the first receive signal and/or the at least one second receive signal as a first transmit/receive intermediate frequency signal and/or as at least one second transmit/receive intermediate frequency signal.

3. The antenna device according to claim 1, further comprising:
    at least one receive channel, comprising:
        a receive frequency conversion device; and
        a receive mixing device with a receive frequency pass band,
    wherein the signal source is connected to the receive frequency conversion device,
    wherein the receive mixing device is connected to the receive frequency conversion device, which is configured to convert the basic frequency of the transmit signal to a receive frequency in a receive frequency pass band of the receive mixing device, in order to receive via the at least one receive channel a receive signal with the receive frequency, and
    wherein the receive mixing device is configured to provide the receive signal via an output of the receive mixing device as a receive intermediate frequency signal.

4. The antenna device according to claim 3, further comprising at least two transmit channels and at least one receive channel, said channels being arranged in a linear and/or grid form with a uniform spacing from one another, forming an antenna group.

5. The antenna device according to claim 4,
    wherein the first transmit frequency, a second transmit frequency, and/or the receive frequency are identical,
    wherein the uniform spacing of said channels is half a wavelength of the first transmit frequency, half a wavelength of the second transmit frequency, and/or half a wavelength of the receive frequency, and
    wherein the wavelength results from a propagation speed of a wave, which is produced by a signal with the respective frequency, divided by the respective frequency.

6. The antenna device according to claim 3, further comprising an isolator arranged between the signal source and at least one of the first frequency conversion device, a second frequency conversion device, and/or the receive frequency conversion device,
    wherein the isolator is configured to suppress a signal reflection in a conversion break of the time-controlled conversion of the basic frequency of the transmit signal to the first transmit frequency, and/or in a conversion break of the time-controlled conversion of the basic frequency of the transmit signal to at least one second transmit frequency, and/or in a conversion break of the conversion of the basic frequency of the transmit signal to the receive frequency, in order to prevent a first receive signal, a second receive signal, and/or the receive signal from reaching the signal source and/or other transmitters and/or receivers, respectively.

7. The antenna device according to claim 1, wherein at least one of the first frequency conversion device and the second frequency conversion device is connected to a switchable energy supply for the time-controlled conversion of the basic frequency of the transmit signal to the first transmit frequency or the time-controlled conversion of the basic frequency of the transmit signal to the second transmit frequency.

8. The antenna device according to claim 1, further comprising an evaluation device configured to receive the specifiable overall time schedule and/or at least two intermediate frequency receive signals chosen from the group of intermediate frequency receive signals consisting of:
- a first transmit/receive intermediate frequency signal,
- at least one second transmit/receive intermediate frequency signal, and
- a receive intermediate frequency signal,
- wherein the evaluation device is further configured to determine a receive echo curve for a spatial direction by digital beamforming from the specifiable overall time schedule and the at least two intermediate frequency receive signals.

9. The antenna device according to claim 8,
- wherein the digital beamforming comprises formation of a virtual co-array, and
- wherein the virtual co-array has an extension that is greater than a physical extension of the antenna device in at least one spatial direction.

10. The antenna device according to claim 1, further comprising a processing device configured to determine a fill level, a volume of an object, a mass of the object, and/or a surface structure of the object, from at least one of the overall time schedule, a receive intermediate frequency signal, a transmit/receive intermediate frequency signal, and/or a spatial orientation.

11. The antenna device according to claim 1,
- wherein the antenna device is a two-conductor device, and
- wherein an energy supply line is used for data transmission.

12. A fill level measuring device for determining a fill level and/or for determining a surface structure of an object with an antenna device according to claim 1.

13. A method for transmitting and/or receiving a signal by a multiple-input multiple-output fill level radar unit, which operates according to a frequency-modulated continuous-wave principle and a time-division multiplexing method, comprising:
- generating a transmit signal with a basic frequency in a signal source by a single phase-locked loop;
- supplying the transmit signal to a plurality of transmit channels comprising a first transmit channel, comprising a first frequency conversion device and a first transmit device with a first frequency pass band, and at least one second transmit channel, comprising a second frequency conversion device and a second transmit device with a second frequency pass band;
- switching on and off of the first frequency conversion device; and
- converting in a time-controlled manner the basic frequency of the transmit signal to a first transmit frequency, which lies in a first frequency pass band of the first transmit device, in order to provide via the first transmit channel a first transmit signal with the first transmit frequency, and to at least a second transmit frequency, which lies in a second frequency pass band of the second transmit device, in order to provide via the at least one second transmit channel a second transmit signal with the second transmit frequency;
- wherein the conversion of the basic frequency of the transmit signal to the first transmit frequency in the first frequency passband takes place according to a specifiable first time schedule according to the time-division multiplexing method and the conversion of the basic frequency to the second transmit frequency takes place according to at least one specifiable second time schedule.

14. A nontransitory computer-readable storage medium having stored therein a program for transmitting and/or receiving a signal, which when executed by a processor of an antenna device for a multiple-input multiple-output fill level radar unit, which operates according to a frequency-modulated continuous-wave principle and a time-division multiplexing method, executes a method comprising:
- generating a transmit signal with a basic frequency in a signal source by a single phase-locked loop;
- supplying the transmit signal to a plurality of transmit channels comprising a first transmit channel, comprising a first frequency conversion device and a first transmit device with a first frequency pass band, and at least one second transmit channel, comprising a second frequency conversion device and a second transmit device with a second frequency pass band;
- switching on and off of the first frequency conversion device; and
- converting in a time-controlled manner the basic frequency of the transmit signal to a first transmit frequency, which lies in a first frequency pass band of the first transmit device, in order to provide via the first transmit channel a first transmit signal with the first transmit frequency, and to at least a second transmit frequency, winch lies in a second frequency pass band of the second transmit device, in order to provide via the at least one second transmit channel a second transmit signal with the second transmit frequency;
- wherein the conversion of the basic frequency of the transmit signal to the first transmit frequency in the first frequency passband takes place according to a specifiable first time schedule according to the time-division multiplexing method and the conversion of the basic frequency to the second transmit frequency takes place according to at least one specifiable second time schedule.

* * * * *